(12) United States Patent
Liu et al.

(10) Patent No.: US 10,929,717 B2
(45) Date of Patent: Feb. 23, 2021

(54) ARTICLE DAMAGE DETECTION

(71) Applicant: Advanced New Technologies Co., Ltd., George Town (KY)

(72) Inventors: Yongchao Liu, Hangzhou (CN); Haitao Zhang, Hangzhou (CN); Yufeng Guo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,568

(22) Filed: May 29, 2020

(65) Prior Publication Data
US 2020/0293830 A1   Sep. 17, 2020

Related U.S. Application Data

(63) Continuation of application No. PCT/CN2019/073837, filed on Jan. 30, 2019.

(30) Foreign Application Priority Data

Apr. 3, 2018   (CN) .......................... 201810295312.8

(51) Int. Cl.
*G06K 9/00*   (2006.01)
*G06K 9/62*   (2006.01)
*G06N 3/08*   (2006.01)

(52) U.S. Cl.
CPC ........... *G06K 9/6259* (2013.01); *G06K 9/627* (2013.01); *G06K 9/629* (2013.01); *G06N 3/08* (2013.01)

(58) Field of Classification Search
CPC ...... G06K 9/6259; G06K 9/627; G06K 9/629; G06N 3/08
See application file for complete search history.

(56) References Cited

U.S. PATENT DOCUMENTS 9,824,453 B1 *  11/2017  Collins .................. G06Q 40/08
10,657,707 B1 *  5/2020  Leise ..................... G06N 20/00
(Continued)

FOREIGN PATENT DOCUMENTS

| CN | 105160318 | 12/2015 |
|----|-----------|---------|
| CN | 105335710 | 2/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Aaron W Carter
(74) *Attorney, Agent, or Firm* — Fish & Richardson P.C.

(57) ABSTRACT

The present specification provides an article damage detection method, including: obtaining at least two images that are time sequentially related and show a detected article at different angles; and inputting the images to a detection model in time order, to determine a damage detection result, where the detection model includes a first sub-model and a second sub-model, the first sub-model identifies respective features of each image, a feature processing result of each image is input to the second sub-model, the second sub-model performs time series analysis on the feature processing result to determine the damage detection result, and the first sub-model and the second sub-model are obtained by performing joint training by using training samples labeled with article damage.

17 Claims, 3 Drawing Sheets

(56) References Cited

U.S. PATENT DOCUMENTS

| | | | | |
|---|---|---|---|---|
| 2005/0251427 | A1* | 11/2005 | Dorai | G06Q 40/08 |
| | | | | 705/4 |
| 2011/0040692 | A1* | 2/2011 | Ahroon | G06Q 50/163 |
| | | | | 705/307 |
| 2015/0317739 | A1* | 11/2015 | Lawlor | G06Q 30/0283 |
| | | | | 705/4 |
| 2016/0284019 | A1 | 9/2016 | Bowles et al. | |
| 2017/0124432 | A1* | 5/2017 | Chen | G06F 40/30 |
| 2017/0293894 | A1* | 10/2017 | Taliwal | G06K 9/6201 |
| 2018/0144248 | A1* | 5/2018 | Lu | G06K 9/481 |
| 2018/0182039 | A1* | 6/2018 | Wang | G06K 9/6268 |
| 2018/0240194 | A1* | 8/2018 | Dong | G06Q 40/08 |
| 2018/0260886 | A1* | 9/2018 | Buttolo | G06Q 30/0645 |
| 2019/0147583 | A1* | 5/2019 | Stefan | G06Q 30/00 |
| | | | | 345/419 |
| 2019/0213563 | A1* | 7/2019 | Zhang | G06N 20/20 |
| 2020/0005090 | A1* | 1/2020 | Shen | G06K 9/6226 |
| 2020/0011808 | A1* | 1/2020 | Ozim | G01B 11/2513 |
| 2020/0034971 | A1* | 1/2020 | Xu | G06T 7/11 |
| 2020/0050867 | A1* | 2/2020 | Zhang | G06K 9/00711 |
| 2020/0057925 | A1* | 2/2020 | Tang | G06K 9/6256 |

FOREIGN PATENT DOCUMENTS

| | | |
|---|---|---|
| CN | 106407942 | 2/2017 |
| CN | 107066980 | 8/2017 |
| CN | 107194323 | 9/2017 |
| CN | 107220667 | 9/2017 |
| CN | 107704932 | 2/2018 |
| CN | 107741781 | 2/2018 |
| CN | 108921811 | 11/2018 |
| JP | 2014142760 | 8/2014 |
| TW | I585698 | 6/2017 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/073837, dated May 7, 2019, 9 pages (with partial English translation).

* cited by examiner

US 10,929,717 B2

ARTICLE DAMAGE DETECTION

CROSS-REFERENCE TO RELATED APPLICATIONS

This application is a continuation of PCT Application No. PCT/CN2019/073837, filed on Jan. 30, 2019, which claims priority to Chinese Patent Application No. 201810295312.8, filed on Apr. 3, 2018, and each application is hereby incorporated by reference in its entirety.

TECHNICAL FIELD

The present specification relates to the field of data processing technologies, and in particular, to article damage detection methods and apparatuses and article damage detectors.

BACKGROUND

With the improvement of living standards, many articles are frequently replaced. Mobile phones are used as an example. Old mobile phones replaced with new devices are usually put aside by users, which causes a resource waste. Recycling of used articles can enable obsolete articles to be reused and put into a new industrial chain link, so that resources can be better integrated and possible environmental pollution can be reduced.

With the emergence of artificial intelligence technologies, online recycling over the Internet becomes a new business model. In terms of online recycling, a damage degree of a recycled article is usually determined based on a picture of the article, and is used as an important factor in price estimation. Damage detection accuracy greatly affects the real value and price estimation of the recycled article.

SUMMARY

In view of this, the present specification provides an article damage detection method, including: obtaining at least two images that are time sequentially related and show a detected article at different angles; and inputting the images to a detection model in time order, to determine a damage detection result, where the detection model includes a first sub-model and a second sub-model, the first sub-model identifies respective features of each image, a feature processing result of each image is input to the second sub-model, the second sub-model performs time series analysis on the feature processing result to determine the damage detection result, and the first sub-model and the second sub-model are obtained by performing joint training by using training samples labeled with article damage.

The present specification further provides an article damage detection apparatus, including: an image sequence acquisition unit, configured to obtain at least two images that are time sequentially related and show a detected article at different angles; and a detection model application unit, configured to input the images to a detection model in time order, to determine a damage detection result, where the detection model includes a first sub-model and a second sub-model, the first sub-model identifies respective features of each image, a feature processing result of each image is input to the second sub-model, the second sub-model performs time series analysis on the feature processing result to determine the damage detection result, and the first sub-model and the second sub-model are obtained by performing joint training by using training samples labeled with article damage.

The present specification provides a computer device, including a storage medium and a processor, where the storage medium stores a computer program that can be run by the processor, and when the processor runs the computer program, the steps of the article damage detection method are performed.

The present specification provides a computer-readable storage medium, where the computer-readable storage medium stores a computer program, and when the computer program is run by a processor, the steps of the article damage detection method are performed.

The present specification further provides an article damage detector, including: a photographing module, configured to generate, based on a photographing instruction from a calculation and control module, at least two images of a detected article that are time sequentially related; a movement module, configured to drive relative movement between a camera of the photographing module and the detected article based on a movement instruction from the calculation and control module; and the calculation and control module, configured to enable, by using the movement instruction and the photographing instruction, the photographing module to generate the at least two images that are time sequentially related and show the detected article at different angles, and determine a damage detection result based on the images, where the damage detection result is generated by using the previous article damage detection method or apparatus.

It can be seen from the previous technical solutions that in the implementations of the article damage detection methods and apparatuses in the present specification, the images that are time sequentially related and show the detected article at different angles are input to the detection model, the first sub-model in the detection model identifies the respective features of each image, the feature processing result is input to the second sub-model after feature processing, and the second sub-model performs time series analysis on the feature processing results of the images to determine the damage detection result. The images at different angles can more comprehensively show a real condition of the article, and therefore a more uniform and complete detection result can be obtained by performing time series analysis on the feature processing results of the images. Therefore, damage detection accuracy can be greatly improved in the implementations of the present specification.

It can be seen that in the implementations of the article damage detector in the present specification, when enabling, by using the movement instruction, the movement module to drive the relative moment between the camera and the detected article, the calculation and control module enables, by using the photographing instruction, the photographing module to generate the at least two images of the detected article that are time sequentially related, and obtains, based on the generated images, the damage detection result generated by using the article damage detection method or apparatus in the present specification. As such, damage detection accuracy is greatly improved while it is more convenient to perform article damage detection.

DESCRIPTION OF IMPLEMENTATIONS

Figure 1:
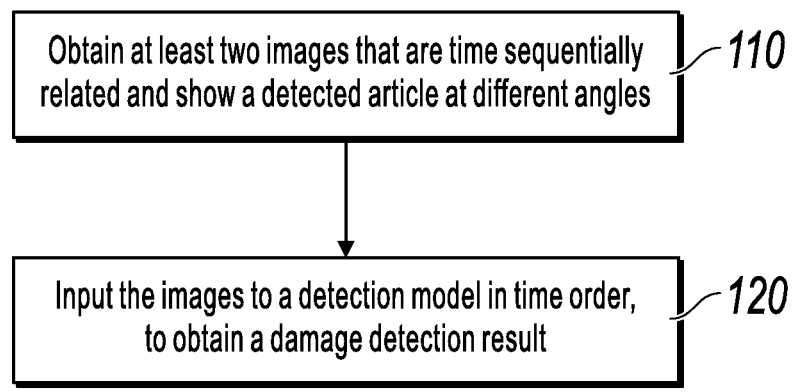
FIG. 1 is a flowchart illustrating an article damage detection method, according to an implementation of the present specification.

Implementations of the present specification provide new article damage detection methods. A detection model is built by using a first sub-model and a second sub-model that are cascaded; the first sub-model uses images of a detected article that are obtained at different angles and generated in time order as inputs, to obtain feature processing results of the images, and outputs the feature processing results to the second sub-model; and the second sub-model performs time series analysis on the feature processing results of the images to determine a damage detection result. As such, damage on the detected article can be found more comprehensively by using the images at different angles, and damage found in the images can be combined into a uniform detection result through time series analysis, thereby greatly improving damage detection accuracy.

The implementations of the article damage detection methods in the present specification can run on any device with computing and storage capabilities, for example, a mobile phone, a tablet computer, a personal computer (PC), a laptop, or a server. Alternatively, functions in the implementation of the article damage detection method in the present specification can be implemented by logical nodes running on two or more devices.

In the implementations of the present specification, a machine learning model that uses at least two images that are time sequentially related as inputs, which is referred to as the detection model, is used to perform article damage detection. The detection model includes two cascaded sub-models. The first sub-model identifies respective features of each image to generate a feature processing result of each image, and the feature processing results of the images are input to the second sub-model in time order. The second sub-model performs time series analysis on the feature processing results of the images to determine a damage detection result.

The first sub-model can be any machine learning model, and an advantageous result usually can be achieved by using an algorithm that is suitable for feature extraction and processing, for example, a deep convolutional neural network (DCNN). The second sub-model can be any machine learning model that can perform time series analysis, for example, a recurrent neural network (RNN), a long short-term memory (LSTM) network, etc. When the second sub-model is the LSTM network, a more accurate damage detection result can be determined if the LSTM network also employs an attention mechanism.

The detection model in the implementations of the present specification is a model trained using supervised learning training, and the entire detection model is trained by using training samples labeled with article damage. In other words, joint training is performed on the first sub-model and the second sub-model, a training loss of the entire model is fed back to both the first sub-model and the second sub-model for parameter update, and parameters of the two sub-models are simultaneously optimized, to optimize an overall prediction accuracy of the detection model. In addition to the label indicating article damage, each training sample includes at least two images of the article that are time sequentially related.

A form of the damage detection result is determined based on a need in an actual application scenario. Implementations are not limited. For example, the damage detection result can be a classification result indicating whether there is damage on the detected article, can be a degree of a certain type of damage on the detected article, can be a classification result indicating whether there are two or more types of damage on the detected article, or can be degrees of two or more types of damage on the detected article. Types of damage can include scratches, damage, stains, adhesives, etc. Sample data can be labeled based on a determined form of the damage detection result, and the damage detection result in this form can be obtained by using the trained detection model.

The feature processing result output by the first sub-model to the second sub-model includes information used by the second sub-model to generate the damage detection result. The feature processing result output by the first sub-model to the second sub-model can be a damage detection result of each single image, or can be another tensor that can specify damage detection result information of the single image. Implementations are not limited.

For example, if the damage detection result output by the detection model is a classification result of each of one or more types of damage (namely, the possibility that there is each of one or more types of damage on the detected article), the feature processing result can include a respective classification result that is of each type of damage in the single image of the detected article and is generated after the first sub-model performs feature extraction and damage discovery on each image, and performs feature fusion on a feature extraction result and a damage discovery result, or can include a respective tensor that specifies damage detection information of each type of damage in the single image of the detected article. The second sub-model can perform time series analysis based on detection information of each type of damage in the at least two images, to obtain a classification result of each type of damage on the detected article.

For another example, assume that the first sub-model in the detection model is the DCNN network. In this case, the first sub-model can use an output of the last convolution layer or pooling layer in a DCNN network (namely, an output before processing at a fully connected layer and an output prediction layer is performed) as the feature processing result, can use an output of the fully connected layer in the DCNN network as the feature processing result, or can use an output of the output prediction layer as the feature processing result.

In the implementations of the present specification, a procedure of the article damage detection method is shown in FIG. 1.

Step 110: Obtain at least two images that are time sequentially related and show a detected article at different angles.

The at least two images that are time sequentially related and show the detected article at different angles can be photos of the detected moving article that are consecutively taken, can be recorded videos (the video includes multiple images arranged in time order) of the detected moving article, can be photos of the detected article that are consecutively taken by using a mobile camera, can be videos of the detected article that are recorded by using a mobile camera, can be at least two photos or videos consecutively taken or recorded by changing a photographing angle, or can be a combination thereof.

The at least two images that are time sequentially related and show the detected article at different angles can be automatically generated, for example, can be generated by using an article damage detector in the present specification, or can be generated by manually holding a photographing device (for example, a mobile phone). Implementations are not limited.

In the present implementation, a device for running the article damage detection methods can independently generate the images, can receive the images from another device, or can read the images from a predetermined storage location. Implementations are not limited. For example, when the methods in the present implementation runs on a mobile phone, the images can be generated by taking a photo or recording a video by using a camera of the mobile phone. For another example, the method in the present implementation can run on a server of a certain application (APP), and a client of the App uploads multiple obtained photos or recorded videos to the server.

Step 120: Input the images to a detection model in time order, to determine a damage detection result.

The trained detection model is used, and the obtained images are input to the detection model in time order, to determine the damage detection result.

Some damage on the detected article cannot be captured by the photographing device at a specific angle. The detected article is photographed at different angles, so that omission of damage on the article in the image can be reduced. More photographing angles indicate a more comprehensive direction and a higher possibility that the images can truly show a condition of the article. Damage on the article showed in the images may be inconsistent (for example, damage A, B, and C is obtained in image 1, and damage B and D is obtained in image 2). After damage discovery is performed by using the first sub-model in the detection model, time series analysis is performed for the same damage found in these images that are time sequentially related, to obtain a complete and uniform view of damage on each part of the detected article, thereby improving damage detection accuracy.

In addition, a damage detection report can be automatically generated based on the damage detection result, and the value of detected article is estimated. For a form of the damage detection report, a specific method for generating the damage detection report, and a specific algorithm used for value estimation, references can be made to the existing technology. Details are omitted for simplicity.

It can be seen that in the implementations of the article damage detection method in the present specification, the detection model is built by using the first sub-model and the second sub-model that are cascaded, and the images that are time sequentially related and show the detected article at different angles are input to the detection model; the first sub-model outputs the feature processing result of each image to the second sub-model; and the second sub-model performs time series analysis on the feature processing results of the images to determine the damage detection result. As such, damage on the detected article can be found more comprehensively by using the images at different angles, and damage found in the images can be combined into a complete, uniform, and more accurate detection result.

Figure 2:
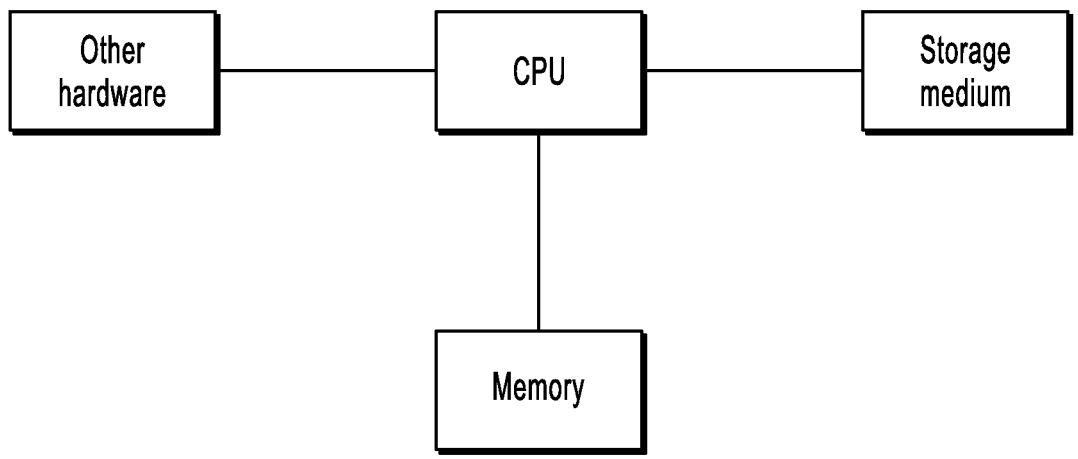
FIG. 2 is a structural diagram of hardware of a device for running an article damage detection method, according to an implementation of the present specification, or of a device in which an article damage detection apparatus is located, according to an implementation of the present specification.

Corresponding to the previous procedure implementation, implementations of the present specification further provide an article damage detection apparatus. The apparatus can be implemented by software, can be implemented by hardware, or can be implemented by a combination of hardware and software. Software implementation is used as an example. As a logical apparatus, the apparatus is formed by reading a corresponding computer program by a central processing unit (CPU) in a device in which the apparatus is located and running the computer program in a memory. In terms of hardware, in addition to the CPU, the memory, and the storage medium shown in FIG. 2, the device in which the article damage detection apparatus is located usually includes other hardware such as a chip for sending and receiving radio signals and/or other hardware such as a card configured to implement a network communications function.

Figure 3:
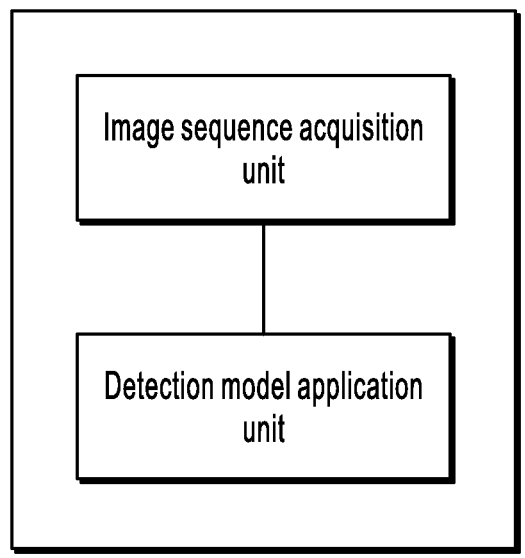
FIG. 3 is a logical structural diagram of an article damage detection apparatus, according to an implementation of the present specification.

FIG. 3 illustrates an article damage detection apparatus, according to implementations of the present specification. The apparatus includes an image sequence acquisition unit and a detection model application unit. The image sequence acquisition unit is configured to obtain at least two images that are time sequentially related and show a detected article at different angles. The detection model application unit is configured to input the images to a detection model in time order, to determine a damage detection result. The detection model includes a first sub-model and a second sub-model, the first sub-model identifies respective features of each image, a feature processing result of each image is input to the second sub-model, and the second sub-model performs time series analysis on the feature processing result to determine the damage detection result. The first sub-model and the second sub-model are obtained by performing joint training by using training samples labeled with article damage.

Optionally, the first sub-model is a deep convolutional neural network, and the second sub-model is a long short-term memory (LSTM) network.

Optionally, the second sub-model is an LSTM network based on an attention mechanism.

Optionally, the at least two images that are time sequentially related and show the detected article at different angles include at least one of the following: photos of the detected moving article that are consecutively taken, recorded videos of the detected moving article, photos of the detected article that are consecutively taken by using a mobile camera, and videos of the detected article that are recorded by using a mobile camera.

In an example, the damage detection result includes a classification result of each of one or more types of damage.

In the previous example, the feature processing result of each image includes a classification result that is of a type of damage in the single image of the detected article and is generated after the first sub-model performs feature extraction, damage discovery, and feature fusion on each image.

Implementations of the present specification provide a computer device, and the computer device includes a storage medium and a processor. The storage medium stores a computer program that can be run by the processor. When the processor runs the stored computer program, the steps of the article damage detection method in the implementations of the present specification are performed. For detailed description of the steps of the article damage detection method, references can be made to the previous content. Details are omitted for simplicity.

Implementations of the present specification provide a computer-readable storage medium. The storage medium stores a computer program. When the computer program is run by a processor, the steps of the article damage detection method in the implementations of the present specification are performed. For detailed description of the steps of the article damage detection method, references can be made to the previous content. Details are omitted for simplicity.

Implementations of the present specification provide a new article damage detector. When instructing a movement module to drive relative movement between a camera and a detected article, a calculation and control module instructs a photographing module to perform consecutive photographing or recording on the detected article, to conveniently and quickly generate multiple images of the detected article that are time sequentially related and are obtained at different angles, and performs damage detection based on these images by using the article damage detection method or apparatus in the implementations of the present specification, to obtain a more accurate detection result.

Figure 4:
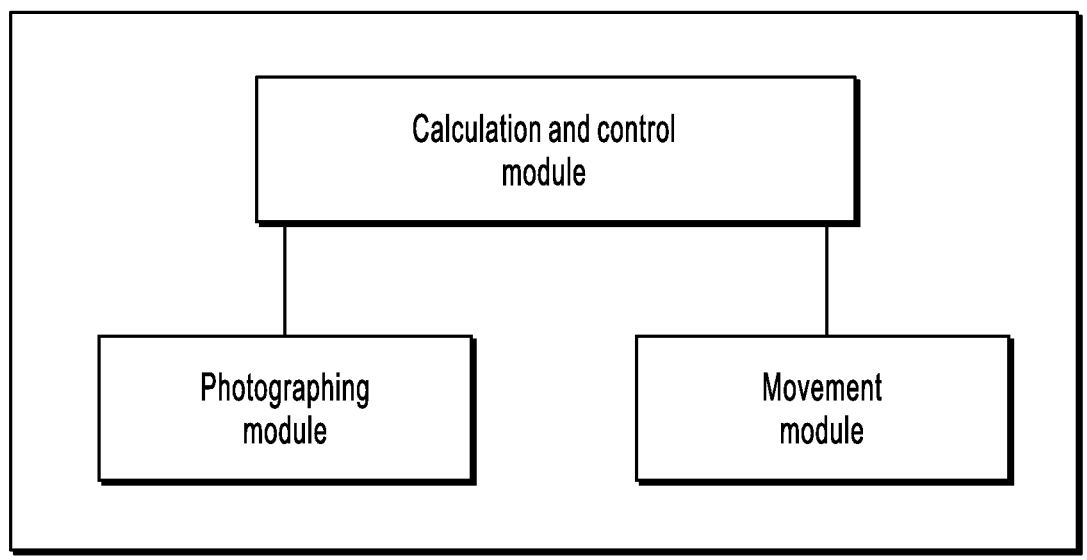
FIG. 4 is a schematic structural diagram of an article damage detector, according to an implementation of the present specification.

A structure of the article damage detector in the present implementation of the present specification is shown in FIG. 4. The article damage detector includes the calculation and control module, the movement module, and the photographing module.

The calculation and control module includes a CPU, a memory, a storage medium, a communications submodule, etc. The CPU reads a program in the storage medium, and runs the program in the memory to generate a movement instruction and a photographing instruction. The communications submodule sends the movement instruction to the movement module, and sends the photographing instruction to the photographing module.

The photographing module includes a camera. After receiving the photographing instruction sent by the calculation and control module, the photographing module performs consecutive photographing or video recording on the detected article, and generates, based on the photographing instruction, at least two images of the detected article that are time sequentially related. The photographing instruction can include one or more photographing-related parameters, for example, a photographing delay time, a time interval for consecutive photographing, the quantity of photos that are to be consecutively taken, and duration for recording a video. The photographing instruction can be set based on a need in an actual application scenario. Implementations are not limited. In addition, the calculation and control module can further send a photographing stop instruction, so that the photographing module stops photographing. The photographing module can store the generated images in a predetermined storage location, or can send the generated images to the calculation and control module. Implementations are not limited either.

The movement module is configured to drive relative movement between the camera of the photographing module and the detected article based on the movement instruction from the calculation and control module. Based on factors such as a size and a weight of the detected article and needs on portability of the article damage detector in an actual application scenario, the movement module can drive the relative movement between the camera and the detected article by moving the detected article, by moving the camera, or by moving both the detected article and the camera.

In an example, the movement module includes an article movement submodule, and the detected article is placed on the article movement submodule. After receiving the movement instruction from the calculation and control module, the article movement submodule performs upward or downward movement, displacement, and/or rotation based on the movement instruction, so that the detected article moves based on the received instruction. In this example, the camera can be fastened, or can move based on the movement instruction in a movement track different from that of the detected article.

In another example, the movement module includes a camera movement submodule, and the camera is installed on the camera movement submodule. After receiving the movement instruction from the calculation and control module, the camera movement submodule performs upward or downward movement, displacement, and/or rotation based on the movement instruction, so that the camera moves based on the received instruction. In this example, the detected article can be fastened, or can move based on the movement instruction in a movement track different from that of the camera.

The movement instruction sent by the calculation and control module can include several movement-related parameters. The movement instruction can be set based on a need in an actual application scenario, specific implementations of the movement module, etc. Implementations are not limited. For example, the movement instruction can include a displacement length, an upward or downward movement height, a rotation angle, and a movement speed. In addition, the calculation and control module can further send a movement stop instruction, so that the movement module stops the relative movement between the detected article and the camera.

When performing article damage detection, the calculation and control module sends the movement instruction to the movement module, to drive the relative movement between the detected article and the camera, and sends the photographing instruction to the photographing module, so that the photographing module generates the at least two images that are time sequentially related and show the detected article at different angles. The calculation and control module obtains, based on the generated images, the damage detection result obtained by using the article damage detection methods or apparatuses in the implementations of the present specification.

In an implementation, the calculation and control module can locally run the article damage detection methods or apparatuses in the implementations of the present specification. The calculation and control module inputs the generated images to a detection model in time order, and an output of the detection model is the damage detection result.

In another implementation, the article damage detection method or apparatus in the implementations of the present specification runs on a server. The calculation and control module of the article damage detector uploads the generated images to the server in time order, and the server inputs the images to a detection model in time order, and returns an output of the detection model to the calculation and control module.

In some application scenarios, a light source module can be added to the article damage detector, and a light control submodule can be added to the calculation and control module. The light control submodule sends a light source instruction to the light source module by using the communications submodule. The light source module provides proper light for the photographing module based on the light source instruction, to improve image generation quality. The calculation and control module can send, based on a light condition in a current environment, a light source instruction that includes parameters such as a light angle and light brightness, so that the light source module controls one or more light sources to satisfy light needs of photographing.

In the previous application scenario, if the movement module includes the camera movement submodule, both the light source of the light source module and the camera of the photographing module can be installed on the camera movement submodule. When the camera movement submodule performs upward or downward movement, displacement, and/or rotation based on the movement instruction, both the camera and the light source are moved at the same time, so that light fully matches photographing to achieve a better photographing effect.

The calculation and control module can further generate a detection report based on the damage detection result, estimate the price of the detected article, and so on.

It can be seen that in the implementations of the article damage detector in the present specification, when enabling, by using the movement instruction, the movement module to drive the relative moment between the camera and the detected article, the calculation and control module enables, by using the photographing instruction, the photographing module to photograph the detected article, to quickly and conveniently generate the at least two images of the detected article that are time sequentially related and are obtained at different angles, and obtains, based on the generated images, the more accurate detection result obtained by using the article damage detection method or apparatus in the present specification.

Specific implementations of the present specification are described above. Other implementations fall within the scope of the appended claims. In some cases, the actions or steps described in the claims can be performed in an order different from the order in the implementations and the desired results can still be achieved. In addition, the process described in the accompanying drawings does not necessarily need a particular execution order to achieve the desired results. In some implementations, multi-tasking and parallel processing can be advantageous.

In an application example of the present specification, a secondhand mobile device merchant places a damage detector in a crowded public place. A user can independently use the damage detector to obtain an estimated recycling price of a secondhand mobile device. The mobile device can be a mobile phone, a tablet computer, a laptop, etc.

Figure 5:
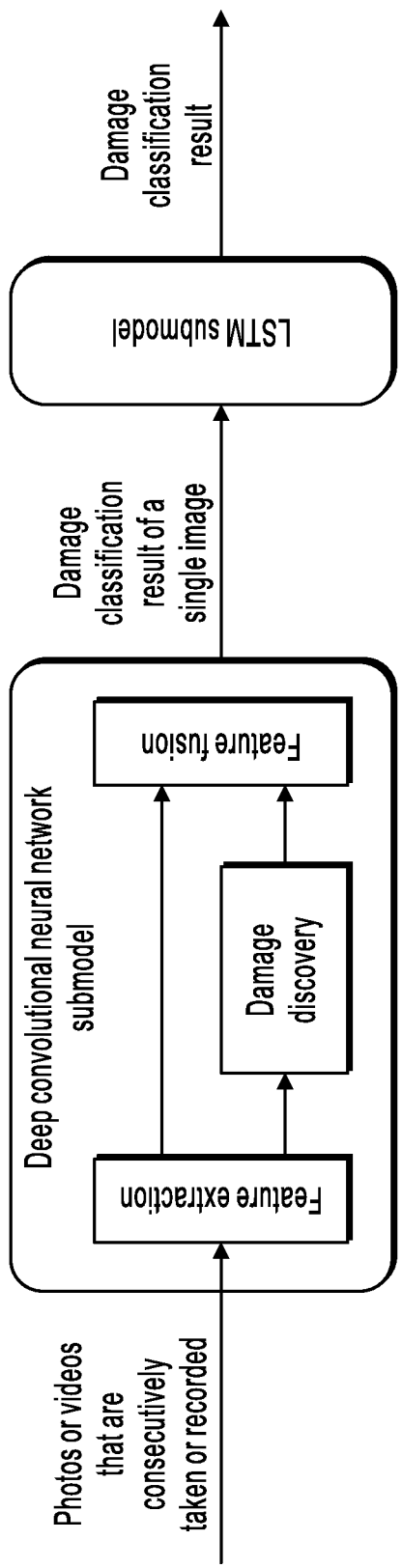
FIG. 5 is a schematic structural diagram of a detection model in an application example of the present specification.

The damage detector includes a trained detection model, and a structure of the detection model is shown in FIG. 5. The detection model includes a deep convolutional neural network sub-model (a first sub-model) and an LSTM sub-model (a second sub-model).

The detection model uses multiple images that are time sequentially related as inputs. The deep convolutional neural network sub-model first performs feature extraction on each image in time order; then identifies a target mobile device from an extracted feature, and performs damage discovery on the target mobile device; and then performs fusion on the initially extracted feature and a feature obtained after damage discovery, to avoid a feature loss that may be caused in the identification process of the target mobile device and the damage discovery process, and generates a damage classification result of the single image based on a feature obtained after fusion.

The deep convolutional neural network sub-model inputs the damage classification result of the single image to the LSTM sub-model in time order. The LSTM sub-model performs time series analysis on damage classification results of consecutive single images, combines the same damage in different single images, and outputs a damage classification result that can fully show a status of the detected mobile device. The LSTM sub-model can use an attention mechanism, to achieve a better time series analysis effect.

In this application example, the damage classification result includes scratches, damage, and adhesives. When the detection model is trained, each training sample is labeled with a value in terms of each type of damage: 0 (there is no this type of damage) or 1 (there is this type of damage). Several such samples are used to perform joint training on the deep convolutional neural network sub-model and the LSTM sub-model. When damage detection is performed by using the trained detection model, the output is the possibility that there is each type of damage on the detected mobile device.

The damage detector includes a calculation and control module, a movement module, a photographing module, and a light source module. The detection model is stored in a storage medium of the calculation and control module. A server of the secondhand mobile device merchant can update a stored program (including the detection model) online by communicating with the calculation and control module.

The movement module includes a platform for accommodating a mobile device, and the platform can rotate based on a movement instruction from the calculation and control module. A camera of the photographing module and a light source of the light source module are fastened around the platform.

After the user launches value evaluation of the secondhand mobile device, and inputs information such as a model and a configuration of the mobile device, the damage detector prompts the user to place the mobile device on the platform. After the user places the mobile device, the calculation and control module determines, based on light in a current environment, light brightness to be used, and sends a light source instruction to the light source module. The light source module lights the light source based on light intensity specified in the instruction. The calculation and control module sends a movement instruction to the movement module, so that the platform rotates 360 degrees. The calculation and control module sends a photographing instruction to the photographing module, so that the photographing module records a video of an article on the platform during rotation of the platform. The photographing module stores the recorded video in a local storage medium.

After the movement module and the photographing module complete work, the calculation and control module instructs the light source module to turn off the light, read the recorded video from the local storage medium, and input images in the video to the detection model in time order, to obtain a classification result of each type of damage on the detected mobile device. The calculation and control module calculates an estimated price of the detected mobile device based on the damage classification result and information such as the model and the configuration of the detected mobile device, and displays the estimated price to the user.

The previous descriptions are merely better examples of implementations of the present specification, but are not intended to limit the present application. Any modification, equivalent replacement, or improvement made without departing from the spirit and principle of the present application shall fall within the protection scope of the present application.

In a typical configuration, a computing device includes one or more central processing units (CPUs), input/output interfaces, network interfaces, and memories.

The memory can include a non-persistent memory, a random access memory (RAM), and/or a nonvolatile memory in a computer-readable medium, for example, a read-only memory (ROM) or a flash memory (flash RAM). The memory is an example of the computer-readable medium.

The computer-readable medium includes persistent, non-persistent, removable, and irremovable media that can store information by using any method or technology. The information can be a computer-readable instruction, a data structure, a program module, or other data. Examples of the computer storage medium include but are not limited to a parameter random access memory (PRAM), a static random access memory (SRAM), a dynamic random access memory (DRAM), another type of random access memory, a read-only memory (ROM), an electrically erasable programmable read-only memory (EEPROM), a flash memory or another memory technology, a compact disc read-only memory (CD-ROM), a digital versatile disc (DVD) or other optical storage mediums, a cassette, a cassette magnetic disk storage medium, another magnetic storage device, or any other non-transmission medium. The computer storage medium can be configured to store information that can be accessed by the computing device. As described in the present specification, the computer-readable medium does not include computer-readable transitory media such as a modulated data signal and carrier.

It is worthwhile to further note that the terms "include", "comprise", and their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . ." does not preclude the existence of additional identical elements in the process, method, product, or device that includes the element.

A person skilled in the art should understand that an implementation of the present specification can be provided as a method, a system, or a computer program product. Therefore, the implementations of the present specification can use a form of hardware only implementations, software only implementations, or implementations with a combination of software and hardware. In addition, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A method for evaluating damages to an article, comprising:
    obtaining at least two images that are time sequentially related and show the article at different angles;
    providing the at least two images as input to a detection model in time order, wherein the detection model comprises a deep convolutional neural network and a long short-term memory (LSTM) network that have been jointly trained on a set of training samples, each training sample comprising multiple training images associated with labels indicating respective article damage degrees of an article shown in the multiple training images;
    processing the at least two images using the deep convolutional neural network to output a feature processing result for each image based on respective features identified from the image;
    processing the feature processing result using the long short-term memory (LSTM) network to receive the feature processing results and to output a damage detection result based on performing time series analysis on the feature processing results, wherein the damage detection result comprises a classification result of each of one or more types of damage; and
    obtaining, as output from the detection model, the damage detection result.

2. The method of claim 1, wherein the long short-term memory (LSTM) network is an attention-based LSTM network.

3. The method of claim 1, wherein the at least two images that are time sequentially related and show the article at different angles comprise at least one of:
    photos of the article in motion captured by a stationary camera, videos of the article in motion recorded by a stationary camera, photos of the article in a stationary state captured by a moving camera, or videos of the article in a stationary state recorded by a moving camera.

4. The method of claim 1, wherein the classification result of each of one or more types of damage comprises a binary variable indicating whether the article bears the type of damage.

5. The method of claim 1, wherein processing the at least two images using the deep convolutional neural network to output the feature processing result comprises, for each image:
    performing feature extraction, damage discovery, and feature fusion to determine the feature processing result.

6. The method of claim 1, wherein obtaining the at least two images comprises:
    moving the article in accordance with a first set of movement instructions; or
    moving a camera in accordance with a second set of movement instructions.

7. The method of claim 1, wherein obtaining the at least two images further comprises:
    illuminating the article in accordance with a set of illumination instructions.

8. A non-transitory, computer-readable medium storing one or more instructions executable by a computer system to perform one or more operations for evaluating damages to an article, wherein the operations comprise:
    obtaining at least two images that are time sequentially related and show the article at different angles;
    providing the at least two images as input to a detection model in time order, wherein the detection model comprises a deep convolutional neural network and a long short-term memory (LSTM) network that have been jointly trained on a set of training samples, each training sample comprising multiple training images associated with labels indicating respective article damage degrees of an article shown in the multiple training images;
    processing the at least two images using the deep convolutional neural network to output a feature processing result for each image based on respective features identified from the image;
    processing the feature processing result using the long short-term memory (LSTM) network to receive the feature processing results and to output a damage detection result based on performing time series analysis on the feature processing results, wherein the damage detection result comprises a classification result of each of one or more types of damage; and obtaining, as output from the detection model, the damage detection result.

9. The non-transitory, computer-readable medium of claim 8, wherein the long short-term memory (LSTM) network is an attention-based LSTM network.

10. The non-transitory, computer-readable medium of claim 8, wherein the at least two images that are time sequentially related and show the article at different angles comprise at least one of:
  photos of the article in motion captured by a stationary camera, videos of the article in motion recorded by a stationary camera, photos of the article in a stationary state captured by a moving camera, or videos of the article in a stationary state recorded by a moving camera.

11. The non-transitory, computer-readable medium of claim 8, wherein the classification result of each of one or more types of damage comprises a binary variable indicating whether the article bears the type of damage.

12. The non-transitory, computer-readable medium of claim 8, wherein processing the at least two images using deep convolutional neural network to output the feature processing result comprises, for each image:
  performing feature extraction, damage discovery, and feature fusion to determine the feature processing result.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for evaluating damages to an article, wherein the operations comprise:
obtaining at least two images that are time sequentially related and show the article at different angles;
providing the at least two images as input to a detection model in time order, wherein the detection model comprises a deep convolutional neural network and a long short-term memory (LSTM) network that have been jointly trained on a set of training samples, each training sample comprising multiple training images associated with labels indicating respective article damage degrees of an article shown in the multiple training images;
processing the at least two images using the deep convolutional neural network to output a feature processing result for each image based on respective features identified from the image;
processing the feature processing result using the long short-term memory (LSTM) network to receive the feature processing results and to output a damage detection result based on performing time series analysis on the feature processing results, wherein the damage detection result comprises a classification result of each of one or more types of damage; and
obtaining, as output from the detection model, the damage detection result.

14. The computer-implemented system of claim 13, wherein the long short-term memory (LSTM) network is an attention-based LSTM network.

15. The computer-implemented system of claim 13, wherein the at least two images that are time sequentially related and show the article at different angles comprise at least one of:
  photos of the article in motion captured by a stationary camera, videos of the article in motion recorded by a stationary camera, photos of the article in a stationary state captured by a moving camera, or videos of the article in a stationary state recorded by a moving camera.

16. The computer-implemented system of claim 13, wherein the classification result of each of one or more types of damage comprises a binary variable indicating whether the article bears the type of damage.

17. The computer-implemented system of claim 13, wherein processing the at least two images using the deep convolutional neural network to output the feature processing result comprises, for each image:
  performing feature extraction, damage discovery, and feature fusion to determine the feature processing result.

* * * * *